July 19, 1966  H. COANDA  3,261,162
LIFTING APPARATUS
Filed May 20, 1964  5 Sheets-Sheet 1

July 19, 1966     H. COANDA     3,261,162
LIFTING APPARATUS Filed May 20, 1964     5 Sheets-Sheet 2

3,261,162
LIFTING APPARATUS
Henri Coanda, Paris, France
(777 Summer St., Stamford, Conn.)
Filed May 20, 1964, Ser. No. 368,852
20 Claims. (Cl. 60—35.5)

This invention relates to lifting apparatus and more particularly to such apparatus which utilizes the physical phenomenon known as the Coanda effect.

The present invention, while of general application, is particularly well suited for use as a propulsion device for aircraft and similar vehicles of the so-called Vertical Take Off-Landing (VTOL) type. Such aircraft are capable of moving both vertically and horizontally and of hovering in a substantially stationary position with a high degree of inherent stability.

In one form of prior apparatus of this type, the lift and horizontal thrust for the aircraft are produced through the use of a series of blower devices which are mounted on a support of generally discoid configuration. As more fully described in U.S. Patent 2,988,303, granted June 13, 1961, to Henri Coanda, for example, the blower devices are arranged radially with respect to the apparatus and direct entrained air along spiral paths to groups of jet discharge nozzles. Each device is provided with one or more slots which utilize the Coanda effect to entrain a mass of ambient air. The air is entrained from one side of the apparatus, while the discharge nozzles are arranged on the opposite side, thus producing a differential pressure to cause motion in the direction of the lower pressure.

As disclosed, for example, in U.S. Patent 2,052,869, granted September 1, 1936, to Henri Coanda, the Coanda effect is produced when air or other fluid under pressure leaves a chamber through an orifice disposed adjacent an extended lip which continuously recedes from the direction of emergence of the fluid. The stream of fluid which passes through the orifice has a tendency to follow the surface having the extended lip, carrying with it a supplementary mass of the ambient fluid. In this way a large volume of ambient fluid is entrained and directed by a small mass of fluid under pressure.

Heretofore, propulsion apparatus of the foregoing type have exhibited certain disadvantages. As an illustration, for apparatus of the type previously employed which was capable of producing a given lift, for example, efforts to increase the lift by increasing the size of the apparatus seriously affected the operating efficiency. As a result, particularly for aircraft traveling at relatively high altitudes, such prior apparatus frequently proved deficient in the realization of the necessary lift. In addition, the comparatively large number of blower devices employed in apparatus of the type used heretofore, together with the various spiral passageways, etc., often necessitated the use of expensive and complicated piping equipment. These latter difficulties have been further compounded by the need for directing the output of the blowers to the jet discharge nozzles.

One general object of this invention, therefore, is to provide new and improved apparatus for producing a fluid propulsion force.

Another object of the invention is to provide propulsion apparatus for aircraft and related vehicles.

Still another object of the invention is to provide apparatus of the character indicated which makes extremely effective use of the Coanda effect.

A further object of this invention is to provide such apparatus which enables the realization of substantially greater lift than has been obtainable heretofore.

Still another object of the invention is to provide lift producing apparatus which is economical to manufacture and thoroughly reliable in operation.

In one illustrative embodiment of this invention, there is provided propulsion apparatus of generally lenticular configuration which includes a pair of fluid conductor means which are symmetrically disposed about an axis of flow. The fluid conductor means respectively include first and second Coanda slots, and their facing surfaces from a third Coanda slot. Fluid under pressure is directed to the fluid conductor means and simultaneously through the first and second Coanda slots to induce a primary flow of ambient air into the third slot. As the air passes through this latter slot, a secondary ambient flow is induced into the stream. The secondary flow is derived from the upper surface of the apparatus, thus providing a zone of reduced pressure thereadjacent, and the combined flow follows the direction of the flow axis to provide a zone of increased pressure beneath the apparatus.

In accordance with one feature of the invention, the secondary flow of ambient fluid, after passing through the third Coanda slot, is directed over the curved surface of a lip member which is supported on the downstream side of the third slot. In several advantageous embodiments, the third slot is arranged in cascading relationship with the first and second slots, and the throat dimensions for the various slots, rather than being directly proportional to the overall size of the apparatus, are established in accordance with unique and predetermined relationships to provide optimum operating efficiency for apparatus of widely varying size. In addition, the curved surface of the lip member is of particular configuration and is defined by a parabolic segment which is revolved about the axis of the apparatus to enable maximum effective utilization of the Coanda effect.

In accordance with another feature of the invention, in several good arrangements, each of the fluid conductor means comprises an annular conduit having a curved surface which is parabolic in shape and which cooperates with the corresponding first or second Coanda slot. The various parabolic surfaces adjacent the Coanda slots are arranged to provide a substantial pressure differential between the upper and lower faces of the apparatus to produce an unusually high lift. Moreover, particularly because of the momentum produced by the action of the annular conduits, the apparatus enables the realization of an extremely large flow augmentation.

In accordance with a further feature of certain embodiments of the invention, there is provided a unique arrangement for supplying fluid to the annular conduits. The arrangement includes an additional Coanda slot which induces a substantial flow of ambient air into the conduits from adjacent the upper face of the apparatus. With this arrangement, the lift and flow augmentation are further enhanced.

The present invention, as well as further objects and features thereof, will be understood more clearly and fully from the following description of certain preferred embodiments, when read with reference to the accompanying drawings, in which.

Figures 1, 2, 3:
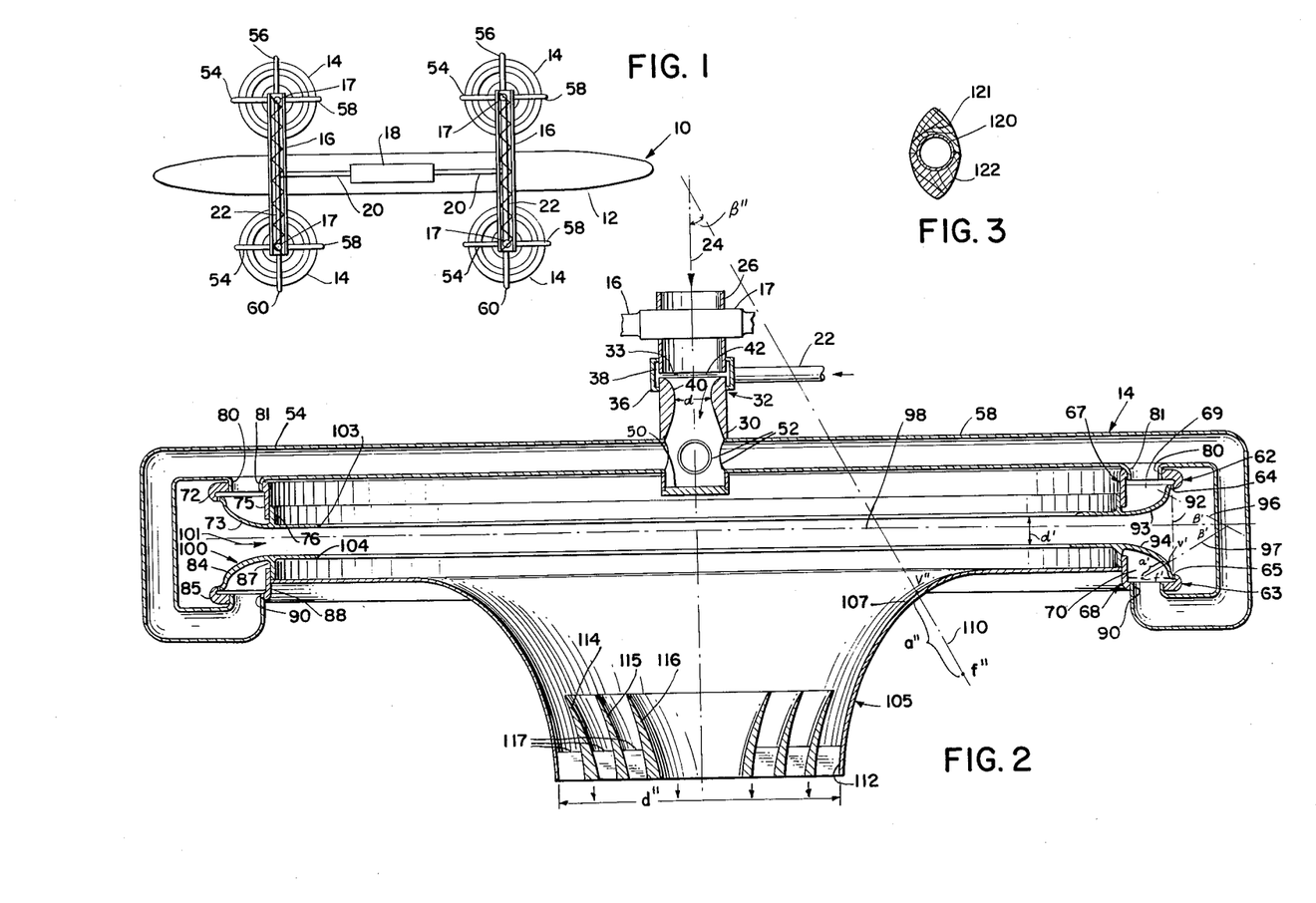
FIGURE 1 is a schematic plan view of an aircraft utilizing a plurality of propulsion apparatus in accordance with one preferred embodiment of this invention.
FIGURE 2 is an enlarged vertical cross-sectional view, with certain parts broken away, of one of the propulsion apparatus shown in FIGURE 1.
FIGURE 3 is a vertical cross-sectional view of an airfoil and associated parts useful with the apparatus.

Referring to FIGURE 1, an aircraft 10 comprises a fuselage schematically shown at 12 and four propulsion devices 14 of generally discoid configuration. In the illustrated embodiment, the devices 14 are mounted at the outer ends of two elongated structural members 16 which are transversely supported in spaced-apart relationship with each other on the upper surface of the fuselage 12. A gimbal connection 17 serves to maintain each of the devices 14 pivotally suspended from the corresponding structural member to enable movement of the devices (by means not shown) to control the direction of travel of the aricraft. In other good arrangements, the devices 14 are mounted in stationary positions, such as within a wing or other airfoil, for example, and the direction of flight is determined by movable vanes carried therebeneath.

Each of the propulsion devices 14 is supplied with fluid under pressure from a pressure source 18. In the embodiment of FIGURE 1, the source 18 advantageously comprises a gas turbine for generating a pressurized gaseous fluid, although in other embodiments liquids such as water, etc., may be employed with good effect. The source 18 is arranged to supply the fluid to each of the devices 14 through a conduit 20 and a branch conduit 22.

As best shown in FIGURE 2, each of the propulsion devices 14 is uniformly disposed about a centrally located flow axis 24. The gimbal connection 17, shown schematically in this figure, supports an upstanding tube 26 which is positioned along the axis 24 and is open at its upper end to the atmosphere. The lower end of the tube 26 is in spaced juxtaposition with a second tube 30 which serves as an internal nozzle and is coaxially aligned with the tube 26. The facing portions of the tubes 26 and 30 form a Coanda nozzle 32 having an annular Coanda slot 33 therebetween. The nozzle 32 is enclosed by a cylindrical jacket 36 having an annular chamber 38 therein which is in open communication with the corresponding branch conduit 22. The pressurized fluid from the conduit 22 is introduced into the chamber 38 and emerges from the slot 33 in a horizontal plane indicated schematically in FIGURE 2 by the line 42. This plane meets the flow axis 24 at a right angle.

Figure 7:
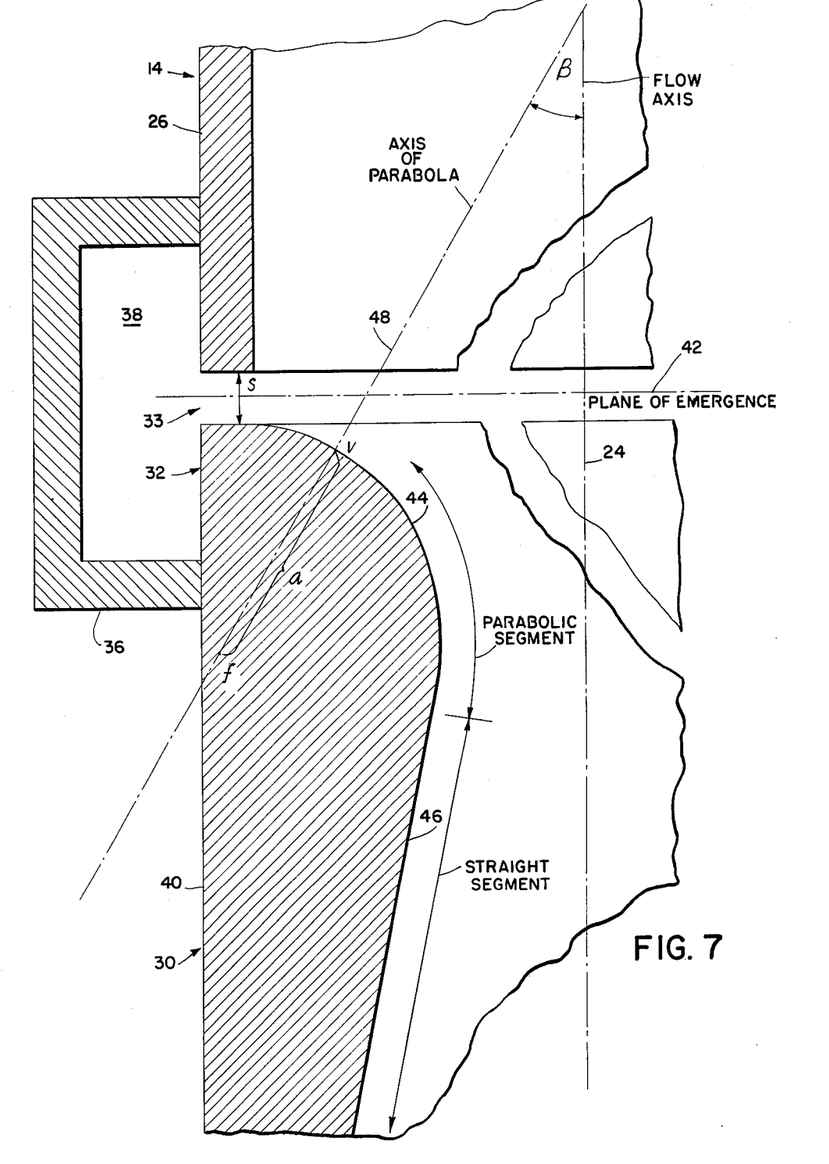
FIGURE 7 is an enlarged cross-sectional view, partially schematic and with certain parts broken away, of a portion of the apparatus of FIGURE 2.

The characteristics of the Coanda nozzle 32, which in some respects are similar to those of the other Coanda nozzles in the various illustrated embodiments of the invention, can best be understood with reference to FIGURES 2 and 7. The nozzle 32 includes a protruding lip 40 which is formed on the inner cylindrical surface of the tube 30 a short distance beneath the plane of emergence 42 of the pressurized fluid through the Coanda slot 33. The inner surface of the tube 30 converges sharply to a throat having a minimum planar area of a diameter "$d$" and then continuously increases in size, thus forming a convergent-divergent nozzle.

FIGURE 7 is an enlarged, partially schematic view of a portion of FIGURE 2. The lip 40 includes a parabolic surface 44 which extends from immediately adjacent the Coanda slot 33 to a point adjacent the throat of the tube 30. This portion of the lip 40 continuously recedes from the plane 42 of emergence of the pressurized fluid. The surface 44 is formed by a segment of a parabola which is removed about the flow axis 24 and includes a parabolic axis 48. This latter axis intersects the surface 44 at a vertex $v$ and advantageously forms an acute angle $\beta$ (beta) with respect to the direction of fluid flow along the axis 24 to achieve the optimum Coanda effect.

A comparatively straight segment 46 merges with the parabolic segment and defines the diverging portion of the lip 40.

In some embodiments of the invention, the angle $\beta$ advantageously lies within predetermined, well defined limits and is determined in part by the maximum desired lift in a particular propulsion device. In cases in which comparatively high maximum lift is needed, the angle $\beta$ is small, while somewhat larger angles are employed in cases in which the lift requirements are lower. In certain particularly good arrangements, the angle $\beta$ is within the range of from about 10° to about 45° to achieve the optimum lift characteristics.

The vertex $v$ of the parabola forming the parabolic surface 44 is located on this surface in spaced relationship with the plane 42 of emergence. The shape of the surface 44 may be expressed in terms of the distance $a$ between the vertex $v$ and the parabolic focus $f$ lying along the axis 48. In several good embodiments, this distance $a$ is closely related to the throat diameter $d$ (FIGURE 2) such that the ratio $d/a$ lies within a predetermined range. Preferably, the ratio extends between 5 and 25 to provide a Coanda lip 40 of optimum shape and thereby make maximum effective use of the Coanda effect.

As the pressurized fluid from the source 18 (FIGURE 1) passes through the Coanda solt 33, a low pressure zone is formed along the parabolic surface 44 of the lip 40. Because of the annular configuration of this surface, the low pressure zone extends across the tube 30 immediately adjacent the throat and entrains a large mass of ambient air from the open upper end of the tube. The combined air and fluid move vertically along the flow axis 24 at reduced pressure and substantially increased velocity. The Coanda nozzle 32 and associated parts thus serve as the first stage of the device 14 and produce a primary flow of accelerated ambient air which is taken from the upper portion of the device and passes through the tube 30 along a downwardly directed path.

Figure 4:
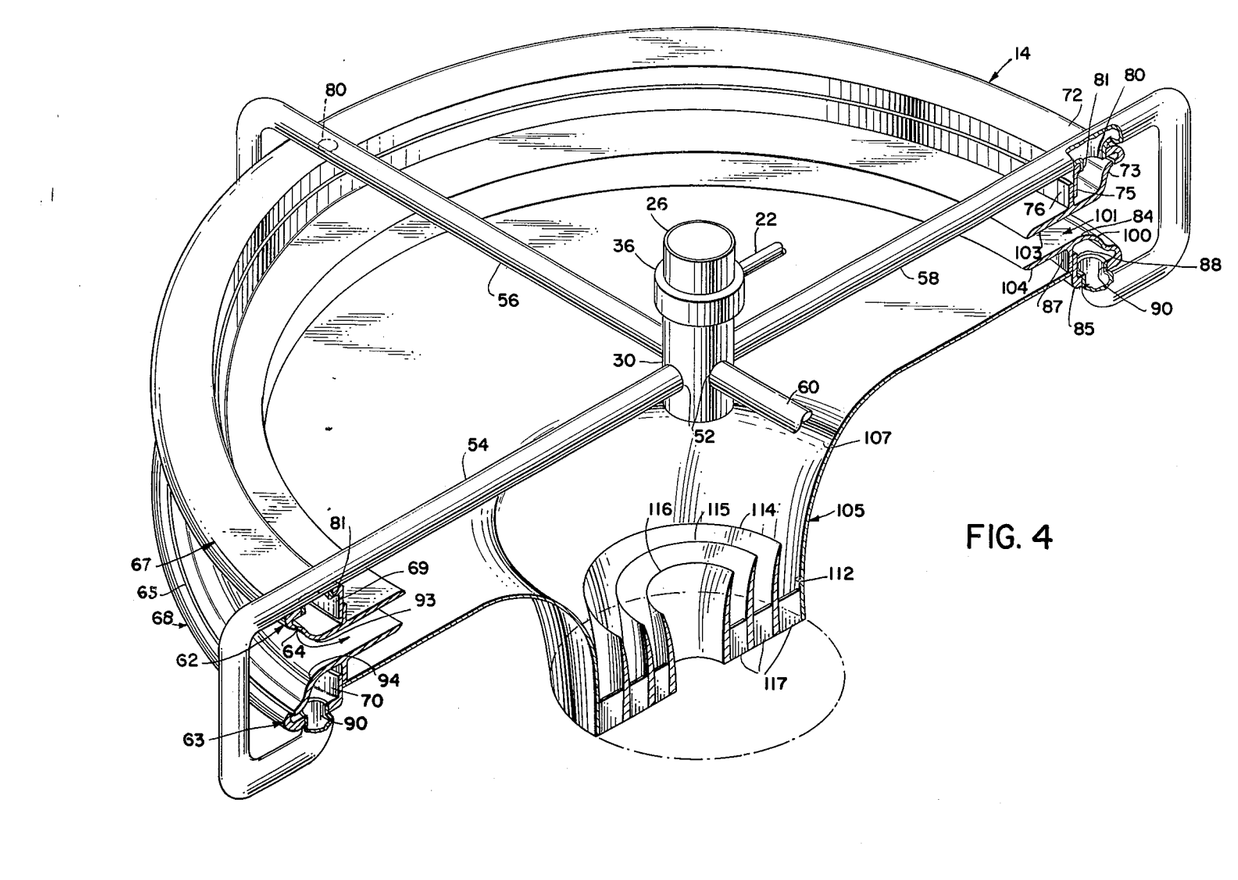
FIGURE 4 is a perspective view, partially broken away and in section, of the apparatus illustrated in FIGURE 2.

The lower end of the tube 30 is closed by a generally circular plate 50. As best shown in FIGURES 2 and 4, four circular openings 52 are provided in the tube immediately above the plate 50 and are respectively connected to radially extending pipes 54, 56, 58 and 60. These pipes are arranged in a horizontal plane at right angles to each other, the pipes 54 and 58 being coaxially supported and extending in a direction perpendicular to the coaxial pipes 56 and 60.

There are two second stage Coanda nozzles 62 and 63 and corresponding Coanda slots 64 and 65. The slots 64 and 65 are respectively defined by two fluid conductor means, such as the annular conduits 67 and 68, for example, which enclose corresponding fluid chambers 69 and 70. The conduits 67 and 68 are symmetrically disposed about the axis of flow 24 and are maintained in spaced-apart relationship with each other in a manner that will become more fully apparent hereinafter.

The annular conduit 67 includes an upper ring 72 and a lower ring 73. The ring 72 is provided with an integrally formed depending portion 75 which is rigidly affixed to an upwardly protruding portion 76 of the ring 73 to form the inner side wall of the conduit 67. The outermost rim of the ring 72 is bent downwardly and is positioned in spaced relationship with the adjacent rim of the ring 73 such that the facing portions of the rings form the upper Coanda nozzle 62, the space therebetween being of annular configuration and defining the Coanda slot 64. This slot connects the chamber 69 to the atmosphere and faces in a generally downward direction. Four circular openings 80 are formed in the upper surface of the ring 72 at ninety-degree intervals to respectively accommodate depending tubes 81 integrally formed with the radially extending pipes 54, 56, 58 and 60. The tubes 81 provide support for the annular conduit 67 and serve to maintain each pipe in open communication with the chamber 69.

In a similar manner, the annular conduit 68 is fabricated from an upper ring 84 and a lower ring 85. These rings are connected together by respective integrally formed portions 87 and 88 which serve as the inner wall of the chamber 70. The outer rim of the ring 85 is bent upwardly and is arranged in spaced relationship with the adjacent rim of the ring 84 to form the Coanda slot 65 therebetween, and the facing portions of the rings 84 and 85 define the Coanda nozzle 63. The slot 65 faces upwardly and connects the chamber 70 to the atmosphere. The ring 85 includes four openings 90 at ninety-degree intervals which respectively accommodate the free ends of the pipes 54, 56, 58 and 60, thus providing support for the conduit 68 and maintaining the same in spaced relationship with the conduit 67. The outermost portions of these pipes extend downwardly and are of generally U-shaped configuration to meet the openings 90.

The accelerated initial flow of ambient air, together with the pressurized fluid from the source 18 (FIGURE 1), moves through the pipes 54, 56, 58 and 60 and into the chamber 69 formed by the upper conduit 67 and the chamber 70 formed by the lower conduit 68. The accelerated fluid then passes simultaneously through the Coanda slots 64 and 65. These slots are in vertical alignment with each other such that the fluid passing through the slots emerges in a direction parallel to the flow axis 24, as shown schematically in FIGURE 2 by the line 92, with the fluid from the slot 64 being directed in a downward direction while that from the slot 65 being directed upwardly.

On the downstream side of the fluid emerging from the Coanda slot 64, there is provided an external parabolic surface 93 on the lower ring 73 of the conduit 67. Similarly, the upper ring 84 of the conduit 68 includes an external parabolic surface 94 on the downstream side of the fluid emerging from the Coanda slot 65. The surfaces 93 and 94 form protruding lips for the Coanda nozzles 62 and 63, respectively, and are each defined by a segment of a parabola which is revolved about the main flow axis 24. As the fluid in the conduits 67 and 68 passes through the slots 64 and 65, a low pressure zone is formed along the surfaces 93 and 94 which extends throughout the space between the conduits. A large mass of secondary ambient air is entrained from the peripheral edge of the device which merges with the fluid from the slot 64 and 65. The combined air and fluid move horizontally in a generally radial direction toward the flow axis 24 along a plane indicated schematically at 98.

The parabolic axis 96 for the surface 93 and the parabolic axis 97 for the surface 94 each form an acute angle $\beta'$ with respect to the direction 98 of the fluid flowing between the conduits 67 and 68. Although various angles $\beta'$ may be employed in accordance with the invention, depending among other things on the maximum desired lift for the device, in some advantageous embodiments the angle $\beta'$ preferably is within the 10° to 45° range specified above for best results.

As indicated heretofore, the shape of a given parabolic surface may be expressed in terms of the distance between the vertex and the parabolic focus. With respect to the parabolic surfaces 93 and 94, the vertex $v'$ and the focus $f'$ are separated by a distance $a'$. This distance is closely related to the minimum throat distance $d'$ between the annular conduits 67 and 68. In certain advantageous arrangements, the ratio $d'/a'$ extends between 5 and 25 for each of the surfaces 93 and 94. By maintaining the ratio within this range, a substantial increase in momentum is imparted to the air moving inwardly from the conduits 67 and 68 to enable the realization of an extremely large propulsion force.

The facing portions of the annular conduits 67 and 68 form an additional Coanda nozzle 100, the space between the conduits defining a Coanda slot 101. The nozzle 100 and the slot 101 comprise the third stage of the device and are formed by the facing parabolic surfaces 93 and 94 and by two ring-shaped flanges 103 and 104 which are integrally connected to the rings 73 and 85, respectively, and extend inwardly from the corresponding surfaces 93 and 94. The flanges 103 and 104 serve as substantially straight extensions of the surfaces.

Rigidly affixed to the lower conduit 68 is an annular lip member 105 which is symmetrically disposed about the flow axis 24. The member 105 is of circular cross section and includes a parabolic surface 107 which continuously recedes from the plane of emergence, represented by the line 98, of the fluid moving through the Coanda slot 101. The surface 107 is formed by a segment of a parabola which is revolved about the flow axis 24 and includes a parabolic axis 110. In a manner similar to the parabolic axis 48 described above, the axis 110 forms an acute angle $\beta''$ with respect to the direction of fluid flow along the axis 24. In several good embodiments of the invention, the angle $\beta''$ is maintained within the range of from about 10° to about 45° to achieve the optimum Coanda effect. A comparatively straight segment 112 merges with the parabolic segment adjacent the lower portion of the propulsion device.

The vertex $v''$ of the parabola forming the surface 107 is positioned on this surface in spaced relationship with the plane of emergence 98. The distance $a''$ between the vertex $v''$ and the parabolic focus $f''$ on the axis 110 is closely related to the throat diameter $d''$. In several advantageous arrangements, the ratio $d''/a''$ extends between the limits indicated heretofore to provide a surface 107 of optimum shape and thus enable the maximum effective use of the Coanda effect.

As an aid to streamlining the flow of fluid through the throat $d''$ of the member 105, annular vanes 114, 115 and 116 are located within the member 105 in coaxial relationship therewith. These vanes are supported in position by thin, aerodynamically shaped brackets 117.

In operation, fluid under a pressure which is illustratively of the order of one hundred pounds per square inch gauge, for example, is introduced through the conduit 22 into the annular chamber 38. The fluid passes through the Coanda slot 33 and in accordance with the Coanda effect follows the curvature of the protruding lip 40. The influx of fluid serves to reduce the pressure at the throat $d$ below atmospheric and causes an induced flow of ambient air to be sucked into conduit 26.

The induced fluid and the fluid moving through the Coanda slot 33 flow downwardly through the tube 30, the velocity being reduced in the diverging portion of the tube to raise the pressure to just above atmospheric pressure (about 1.2 atmospheres) adjacent the pipes 54, 56, 58 and 60. The combined fluids pass through these pipes and into the annular conduits 67 and 68, where the fluids are uniformly distributed throughout the peripheral portion of the device. The fluids serve as a primary flow which passes simultaneously through the second stage annular Coanda slots 64 and 65 and in accordance with the Coanda effect follows the contour of the parabolic surfaces 93 and 94. A zone of reduced pressure is created within the throat $d'$ to entrain a secondary flow of ambient air from adjacent the periphery of the device. Substantial momentum is imparted to this secondary flow, and a low pressure area is formed around the peripheral edge of the device which provides greatly increased stability during flight.

The combined fluids pass through the third stage Coanda slot 101 and follow the contour defined by the inner parabolic surface 107 of the member 105. The slot 101 is in cascading relationship with the second stage slots 64 and 65, that is, the combined fluids from the slots 64 and 65, together with the induced ambient flow, serve as the input for the slot 101. This input produces a reduced pressure in the vicinity of the throat $d''$ and causes a tertiary flow of ambient air which enters the device from adjacent its upper surface. The ambient flow, along with the air withdrawn from above the tube 26 by the first stage Coanda nozzle 32, form a low pressure area immediately above the upper surface of the device. The fluids directed downwardly along the flow axis 24 from the member 105, on the other hand, produce a zone of increased pressure immediately beneath the device. The resulting pressure differential between the upper and lower surfaces urges the device in the direction of the reduced pressure to produce substantial lift for the aircraft 10 (FIGURE 1).

FIGURE 3 is illustrative of an arrangement for reducing heat loss and air resistance across a laterally extending pipe 120. The pipe 120, which is representative of the pipes 54, 56, 58 and 60 described heretofore, includes a first insulating member 121 affixed to its upper surface and a second insulating member 122 on its lower surface. The members 121 and 122 are aerodynamically contoured and serve as fins to reduce drag. Although the members 121 and 122 may be fabricated from various insulating materials, wood is particularly effective in minimizing any heat losses that might otherwise occur.

Figure 5:
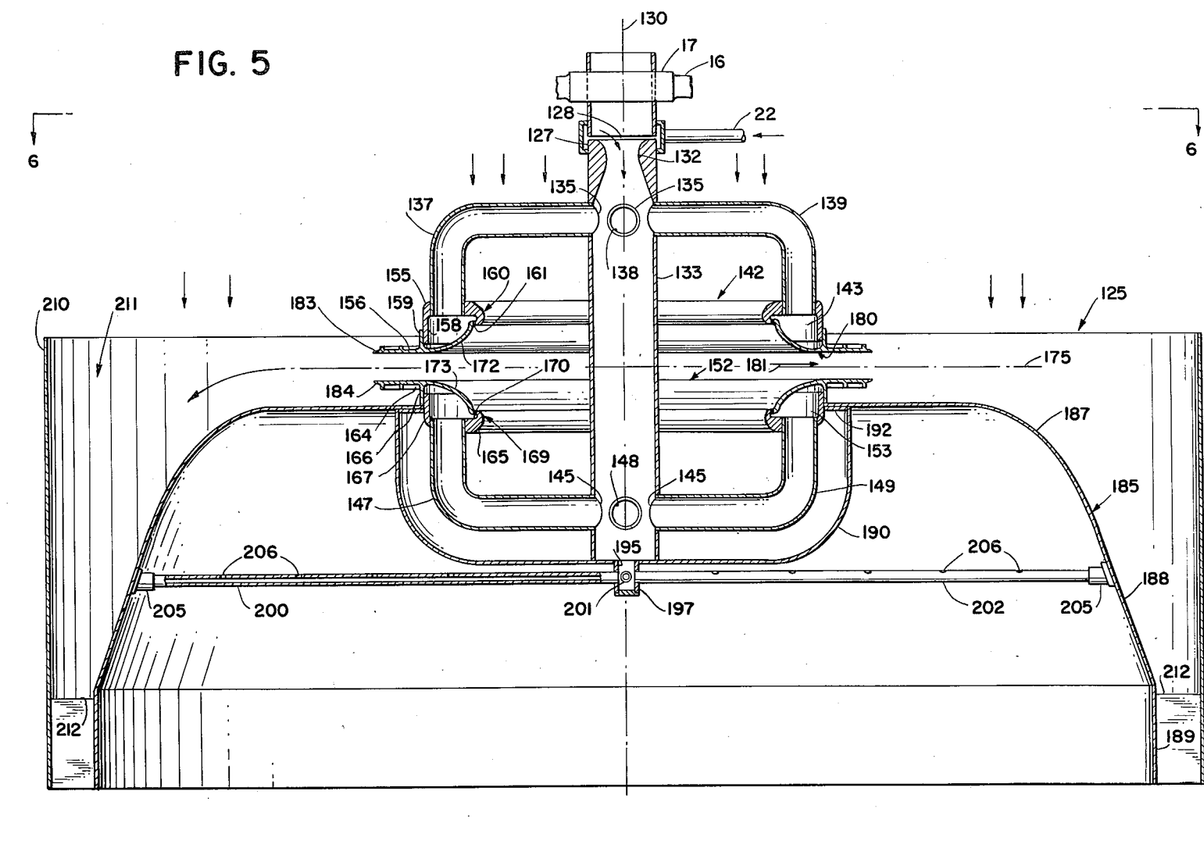
FIGURE 5 is a vertical cross-sectional view, with certain parts broken away, of propulsion apparatus in accordance with another preferred embodiment of the invention.
Figure 6:
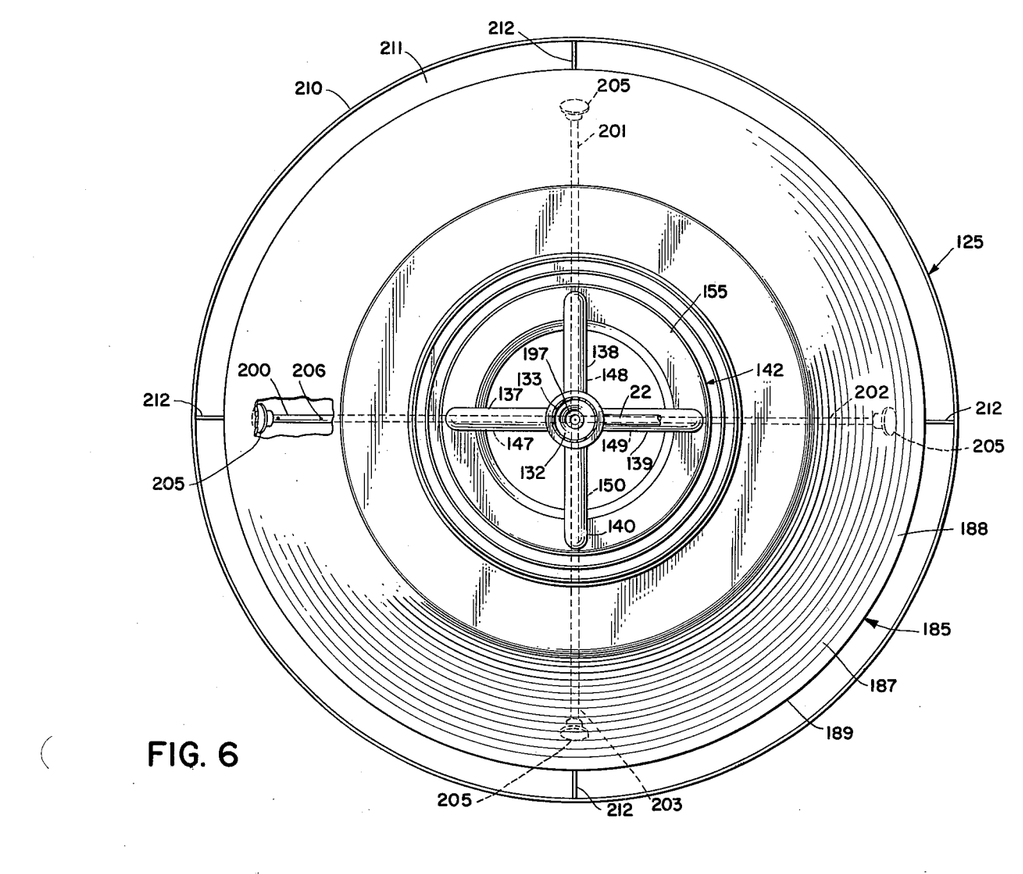
FIGURE 6 is a horizontal sectional view taken along the line 6—6 of FIGURE 5, with certain portions broken away to show internal structure.

Referring now to FIGURES 5 and 6, there is shown a fluid propulsion device 125 of generally discoid configuration which is constructed in accordance with another preferred embodiment of the invention. The device 125 includes a first stage Coanda nozzle 127 and a corresponding Coanda slot 128 which are substantially the same as the first stage nozzle 32 (FIGURE 2) and the slot 33 described above with respect to the device 14. Fluid under pressure is fed to the slot 128 from the branch conduit 22 connected to the pressure source 18 (FIGURE 1). Because of the Coanda effect, the fluid is directed downwardly along a vertical flow axis 130 past the inner parabolic surface 132 of a tube 133. This tube serves as an internal nozzle in a manner similar to the tube 30 of the device 14 and entrains a comparatively large mass of ambient air from adjacent its open upper end.

The tube 133 is substantially longer than the tube 30 of the propulsion device 14. Four openings 135 are provided in the tube 133 a short distance beneath the parabolic surface 132, and these openings are respectively connected to radially extending pipes 137, 138, 139 and 140 (FIGURE 6). The pipes 137, 138, 139 and 140 extend horizontally from the tube 133 at right angles to each other, and their free ends are bent downwardly and are fixedly secured to an annular conduit 142 having a fluid conducting chamber 143 therein. In a similar manner, the lower end of the tube 133 includes four openings 145 which respectively accommodate radially extending pipes 147, 148, 149 and 150, these pipes being hidden in FIGURE 6 by the pipes 137, 138, 139 and 140. The outer ends of the pipes 147, 148, 149 and 150 are bent in an upward direction and are connected to an annular conduit 152. This latter conduit defines a fluid conducting chamber 153.

The annular conduits 142 and 152 are symmetrically disposed about the flow axis 130 in spaced relationship with each other and are of a diameter somewhat less than that of the conduits 67 and 68 (FIGURE 2). The conduit 142 is fabricated from an upper ring 155 and a lower ring 156 which are fixedly secured together by flanges 158 and 159. These flanges form the outer peripheral wall of the chamber 143. The inner portions of the rings 155 and 156 are spaced apart and serve as a second stage Coanda nozzle 160, the space between the inner portions defining a Coanda slot 161. The slot 161 is of annular configuration and is arranged to discharge the fluid received from the pipes 137, 138, 139 and 140 in a vertically downward direction parallel to the flow axis 130.

The annular conduit 152 forms a mirror image of the conduit 142. The conduit 152 includes an upper ring 164 and a lower ring 165 which are maintained in fixed relationship with each other by flanges 166 and 167. The inner edges of the rings 164 and 165 are spaced apart to form an additional second stage Coanda nozzle 169 and corresponding Coanda slot 170 therebetween. The fluid from the pipes 147, 148, 149 and 150 emerges from the Coanda slot 170 and initially follows an upwardly directed path parallel to the axis 130.

The ring 156 of the upper conduit 142 and the ring 164 of the lower conduit 152 respectively include parabolic surfaces 172 and 173 which serve as lips for the second stage Coanda nozzles 160 and 169. The surfaces 172 and 173 are located internally with respect to their corresponding conduits on the downstream side of the Coanda slots 161 and 170. Fluid emerging from these slots follows the path of the surfaces 172 and 173 and is directed outwardly in a radial direction transverse to the flow axis 130 along a horizontal plane 175. The fluid entrains a large mass of ambient air from adjacent the center of the device which is sucked into the space between the conduits 142 and 152.

In a manner similar to that discussed heretofore with respect to the parabolic surfaces 93 and 94 (FIGURE 2) of the propulsion device 14, the surfaces 172 and 173 on the respective conduits 142 and 152 include parabolic axes which form acute angles with respect to the direction of flow of the fluid moving between the conduits. In addition, the distances between the vertices of the parabolas and the parabolic foci are closely related to the minimum throat distance between the conduits in accordance with a predetermined ratio. Although these angles and ratios vary widely depending upon the particular characteristics of a given propulsion device, in several particularly effective embodiments the angles and ratios are maintained within the preferred ranges described above.

The facing portions of the conduits 142 and 152 form a third stage Coanda nozzle 180 having an annular Coanda slot 181. The slot 181 extends outwardly in a radial direction from the parabolic surfaces 172 and 173 between two ring-shaped flanges 183 and 184. These flanges are integrally formed with the respective rings 156 and 164 and form extensions of the corresponding parabolic surfaces. The fluid emerging from the second stage Coanda slots 161 and 170 changes direction as it passes over the parabolic surfaces in accordance with the Coanda effect and, together with the entrained ambient air, is directed horizontally through the third stage slot 181.

Surrounding the lower conduit 152 immediately beneath the Coanda slot 181 is an annular lip member 185 which serves as a skirt to control the flow of fluid through the slot. The member 185 is coaxially supported about the flow axis 130, and its inner rim is rigidly secured to the lower conduit. The member is of circular cross-section and includes an outer parabolic surface 187 which continuously recedes from the plane 175 of emergence of the fluid moving through the slot 181. The surface 187 is defined by a segment of a parabola which is revolved about the axis 130 and includes a parabolic axis which meets the direction of fluid flow along the axis 130 at an acute angle. This angle advantageously is within the range described heretofore with respect to the parabolic surface 107 (FIGURE 2). A comparatively straight segment 188 of the member 185 merges with the parabolic segment and is followed by a second straight segment 189. This latter segment is disposed adjacent the lowermost portion of the member 185, this portion being in the shape of a hollow cylinder.

To insure that the ambient fluid drawn into the Coanda slot 181 is derived from the upper portion of the apparatus, there is provided a cup-shaped shield 190 which is axially disposed along the flow axis 130. The rim of the shield 190 is affixed to a flat ring 192 rigidly secured to the lower conduit 152, while the center shield portion substantially closes the lower end of the elongated tube 133. The ring 192 also serves as support for the inner portion of the lip member 185.

An axial opening 195 of a diameter less than that of the tube 133 is provided in the shield 190. The opening 195 accommodates a comparatively short vertically oriented tube 197 which is closed at its lower end. As best shown in FIGURE 6, four elongated pipes 200, 201, 202 and 203 extend radially from the tube 197 at right angles to each other and are connected at their outer ends to the inner surface of the member 185 by brackets 205. Each of these pipes includes a series of longitudinally spaced openings 206 therein which communicate with the space defined by the inner surface of the member 185. The openings 206 are supplied with fluid under pressure from the elongated tube 133 and the tube 197. The fluid flowing through the openings prevents any substantial low pressure area in the space which might otherwise adversely affect the lift of the apparatus. In addition, the pipes provide structural support for the member 185.

An upstanding shroud 210 surrounds the lip member 185 in spaced coaxial relationship therewith. The shroud 210 is in the form of a hollow cylinder and defines a duct 211 between its inner surface and the outer surface of the member 185. The shroud 210 and the member 185 are fixedly secured together by four comparatively thin brackets 212 (FIGURE 6) which extend in an outward direction from the portion 189 of the member 185.

The fluid discharged from the third stage Coanda slot 181 emerges along the horizontal plane 175 and is directed downwardly over the parabolic lip 187 of the member 185 in accordance with the Coanda effect. This fluid entrains a substantial quantity of ambient air from the upper portion of the device. The entrained air is drawn into the duct 211 and is discharged from the lower portion thereof in the direction of the flow axis 130 to form a zone of increased pressure beneath the device. The resulting pressure differential produces an axially directed lifting force of substantial magnitude.

Because of the pressurized fluid flowing from the pipes 202 into the partially enclosed space defined by the inner surface of the lip member 185, the pressure in this space is increased to a pressure which is at least equal to and preferably slightly greater than atmospheric pressure. With this arrangement, any pressure reduction in the space occasioned as a result of the entrainment of ambient air therein by the tertiary fluid flow through the duct 211 is maintained at a minimum.

In each of the illustrated embodiments of the invention, the propulsion force is produced as a result of a first stage Coanda slot which entrains a primary flow of ambient air, a pair of second stage Coanda slots which entrains a secondary ambient flow and a third stage Coanda slot which entrains a tertiary flow. The various flows are combined and are directed axially with respect to the device to produce the desired lift while avoiding any necessity for the use of moving parts or highly combustible fluids.

In other good arrangements, particularly for comparatively small aircraft having correspondingly lower propulsion requirements, the first stage Coanda slot is eliminated. In these latter situations, the ambient air entrained by the fluid flowing through the pair of Coanda slots 64 and 65 of FIGURE 2, for example, comprises the primary flow, while that entrained by the fluid flowing through the Coanda slot 101 comprises the secondary flow.

Although the invention has been shown and described as having particular application in the propulsion of aircraft by means of gaseous fluid acting on ambient air, it is not, in its broadest aspects, restricted to such application. Thus, the invention is broadly applicable to the movement of a vehicle through a wide variety of ambient mediums through the use of various pressurized fluids. As an illustration, in some cases the apparatus is useful as a propulsion device for underwater vehicles, for example, in which the ambient liquid is entrained by pressurized steam, air, water, or other fluid, to produce the desired propulsion force. Other uses for the apparatus will suggest themselves to those skilled in the art upon a perusal of the foregoing description.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In propulsion apparatus, in combination, first and second fluid conductor means symmetrically disposed about an axis of flow in spaced-apart relationship with each other, said conductor means respectively including first and second Coanda slots and the facing portions of said conductor means defining a third Coanda slot, a supply of fluid under pressure, means for directing fluid from said supply to said conductor means and through said first and second Coanda slots, the fluid passing through said first and second Coanda slots inducing a primary flow of ambient fluid into said third Coanda slot, and lip means on the downstream side of said third Coanda slot and having a curved surface in juxtaposition therewith, the fluid flowing through said third Coanda slot inducing a secondary flow of ambient fluid over said curved surface and in the direction of said axis, to thereby produce an axially directed propulsion force.

2. In propulsion apparatus, in combination, first and second fluid conductor means of generally circular configuration in spaced-apart coaxial relationship with each other, said conductor means respectively including first and second Coanda slots and the facing portions of said conductor means defining a third Coanda slot, a supply of fluid under pressure, means for directing fluid from said supply to said conductor means and simultaneously through said first and second Coanda slots, the fluid passing through said first and second Coanda slots inducing a primary flow of ambient fluid into said third Coanda slot, and lip means symmetrically disposed about the axis of said conductor means and having a curved surface in juxtaposition with said third Coanda slot, the fluid flowing through said third Coanda slot inducing a secondary flow of ambient fluid over said curved surface and in the direction of said axis, to thereby produce an axially directed propulsion force.

3. In propulsion apparatus, in combination, first and second fluid conductor means symmetrically disposed about an axis of flow in spaced-apart relationship with each other, each of said conductor means having an annular surface thereon, said conductor means respectively including first and second Coanda slots cooperating with the corresponding surface and the facing portions of said conductor means defining a third Coanda slot, a supply of fluid under pressure, means for directing fluid from said supply to said conductor means and through said first and second Coanda slots, the fluid passing through said first and second Coanda slots inducing a primary flow of ambient fluid into said third Coanda slot, and lip means on the downstream side of said third Coanda slot and having a curved surface in juxtaposition therewith, said curved surface being defined by a parabolic segment revolved about the axis of flow, the fluid flowing through said third Coanda slot inducing a secondary flow of ambient fluid over said curved surface and in the direction of said axis, to thereby produce an axially directed propulsion force.

4. In propulsion apparatus, in combination, first and second fluid conductor means of annular configuration in spaced-apart coaxial relationship with each other, each of said conductor means having an annular surface thereon, said conductor means respectively including first and second Coanda slots cooperating with the corresponding surface and the facing portions of said conductor means defining a third Coanda slot, a supply of fluid under pressure, means for directing fluid from said supply to said conductor means and through said first and second Coanda slots, the fluid passing through said first and second Coanda slots inducing a primary flow of ambient fluid into said third Coanda slot, and a lip member of circular cross section coaxially supported with respect to said conductor means and having a curved surface in juxtaposition with said third Coanda slot, said curved surface being defined by a parabolic segment revolved about the axis of said member, the fluid flowing through said third Coanda slot inducing a secondary flow of ambient fluid over said curved surface and in the direction of said axis, to thereby produce an axially directed propulsion force.

5. In discoid propulsion apparatus, in combination, first and second annular conduits in spaced-apart coaxial relationship with each other, each of said conduits having a surface of parabolic configuration thereon, said conduits respectively including first and second Coanda slots cooperating with the corresponding surface and the facing portions of said conduits defining a third Coanda slot, a supply of fluid under pressure, means for directing fluid from said supply to said conduits and through said first and second Coanda slots, the fluid passing through said first and second Coanda slots inducing a primary flow of ambient fluid into said third Coanda slot, and an annular member coaxially supported with respect to said conduits and having a curved surface in juxtaposition with said third Coanda slot, said curved surface being defined by a parabolic segment revolved about the axis of said member, the fluid flowing through said third Coanda slot inducing a secondary flow of ambient fluid over said curved surface and in the direction of said axis, to thereby produce an axially directed propulsion force.

6. In propulsion apparatus, in combination, first and second conduits symmetrically disposed about an axis of flow in spaced-apart relationship with each other, each of said conduits having an annular surface thereon coaxial with said flow axis, said conduits respectively including first and second annular Coanda slots cooperating with the corresponding surface and the facing portions of said conduits defining a third annular Coanda slot, a supply of fluid under pressure, means for directing fluid from said supply to said conduits and simultaneously through said first and second Coanda slots, the fluid passing through said first and second Coanda slots inducing a primary flow of ambient fluid into said third Coanda slot, and an annular member on the downstream side of said third Coanda slot and having a parabolic surface the axis of which forms an actue angle with the axis of flow, the fluid flowing through said third Coanda slot inducing a secondary flow of ambient fluid over said parabolic surface and in the direction of said axis, to thereby produce an axially directed propulsion force.

7. Apparatus of the character set forth in claim 6, in which said acute angle is within the range of from about 10 degrees to about 45 degrees.

8. In propulsion apparatus of generally discoid configuration, in combination, first and second annular conduits in spaced-apart relationship with each other, each of said conduits being symmetrically disposed about an axis of flow and having a parabolic surface thereon, said conduits respectively including first and second annular Coanda slots cooperating with the corresponding surface and the facing portions of said conduits defining a third annular Coanda slot, a supply of fluid under pressure, means for directing fluid from said supply to said conduits and through said first and second Coanda slots, the fluid passing through said first and second Coanda slots emerging in a direction parallel to said axis of flow and inducing a primary flow of ambient fluid in a direction transverse to said axis, the fluid from said first and second Coanda slots and said ambient fluid being directed into said third Coanda slot, and a lip member of circular cross-section coaxially supported with respect to said conduits and having a curved surface in juxtaposition with said third Coanda slot, said curved surface being defined by a parabolic segment revolved about said flow axis, the fluid flowing through said third Coanda slot inducing a secondary flow of ambient fluid over said curved surface and in the direction of said axis, to thereby produce an axially directed propulsion force.

9. In propulsion apparatus of generally discoid configuration, in combination, first and second annular conduits in spaced-apart coaxial relationship with each other, each of said conduits being symmetrically disposed about an axis of flow and having a parabolic external surface thereon, said conduits respectively including first and second annular Coanda slots cooperating with the corresponding surface and the facing portions of said conduits defining a third annular Coanda slot, a supply of fluid under pressure, means for directing fluid from said supply to said conduits and simultaneously through said first and second Coanda slots, the fluid passing through said first and second Coanda slots emerging in a direction parallel to said axis of flow and inducing a primary flow of ambient fluid inwardly toward said axis in a direction transverse thereto from the periphery of the apparatus, the fluid from said first and second Coanda slots and said ambient fluid being directed into said third Coanda slot, and an annular lip member coaxially supported with respect to said conduits and having a curved surface in juxtaposition with the inner portion of said third Coanda slot, said curved surface being defined by a parabolic segment revolved about said flow axis, the fluid flowing through said third Coanda slot inducing a secondary flow of ambient fluid over said curved surface and in the direction of said axis, to thereby produce an axially directed propulsion force.

10. In propulsion apparatus of generally discoid configuration, in combination, first and second annular conduits in spaced-apart coaxial relationship with each other, each of said conduits being symmetrically disposed about an axis of flow and having a parabolic internal surface thereon, said conduits respectively including first and second annular Coanda slots cooperating with the corresponding surface and the facing portions of said conduits defining a third annular Coanda slot, a supply of fluid under pressure, means for directing fluid from said supply to said conduits and simultaneously through said first and second Coanda slots, the fluid passing through said first and second Coanda slots emerging in a direction parallel to said axis of flow and inducing a primary flow of ambient fluid outwardly away from said axis in a direction transverse thereto, the fluid from said first and second Coanda slots and said ambient fluid being directed into said third Coanda slot, and a lip member of circular cross-section coaxially supported with respect to said conduits and having a curved surface in juxtaposition with the outer portion of said third Coanda slot, said curved surface being defined by a parabolic segment revolved about said flow axis, the fluid flowing through said third Coanda slot inducing a secondary flow of ambient fluid over said curved surface and in the direction of said axis, to thereby produce an axially directed propulsion force.

11. Propulsion apparatus comprising, in combination, first and second conduits of annular configuration in spaced-apart coaxial relationship with each other, each of said conduits having a curved surface thereon, said conduits respectively including first and second Coanda slots cooperating with the corresponding surface and the facing portions of said conduits defining a third Coanda slot, a supply of fluid under pressure, fluid conductor means connected between said supply and said conduits, said conductor means including an additional Coanda slot supplied with said pressurized fluid and communicating with the atmosphere, the fluid supplied to said additional Coanda slot inducing a primary flow of ambient fluid into said conduits and through said first and second Coanda slots, the fluid passing through said first and second Coanda slots inducing a secondary flow of ambient fluid into said third Coanda slot, and a lip member of circular cross-section coaxially supported with respect to said conduits and having a curved surface adjacent the discharge side of said third Coanda slot, said curved surface being defined by a parabolic segment revolved about the axis of said member, the fluid flowing through said third Coanda slot inducing a tertiary flow of ambient fluid over said curved surface and in the direction of said axis, to thereby produce an axially directed propulsion force.

12. A discoid propulsion device for producing an axially directed propulsion force comprising, in combination, first and second annular conduits in spaced-apart coaxial relationship with each other, each of said conduits having an annular surface of parabolic configuration, said conduits respectively including first and second Coanda slots cooperating with the corresponding surface and the facing portions of said conduits defining a third Coanda slot, a supply of fluid under pressure, fluid conductor means connected between said supply and said conduits, said conductor means including an additional Coanda slot having a parabolic discharge lip, said additional Coanda slot being supplied with said pressurized fluid and communicating with the atmosphere to induce a primary flow of ambient fluid over said discharge lip, into said conduits and through said first and second Coanda slots, the fluid passing through said first and second Coanda slots inducing a secondary flow of ambient fluid into said third Coanda slot, and a lip member of circular cross-section coaxially supported with respect to said conduits and having a curved surface adjacent the discharge side of said third Coanda slot, said curved surface being defined by a parabolic segment revolved about the axis of said lip member, the fluid flowing through said third Coanda slot inducing a tertiary flow of ambient fluid over said curved surface and in the direction of said axis, to thereby produce an axially directed propulsion force.

13. Propulsion apparatus comprising, in combination, first and second annular conduits symmetrically disposed about an axis of flow in spaced-apart coaxial relationship with each other, each of said conduits having an annular parabolic surface thereon, said conduits respectively including first and second annular Coanda slots cooperating with the corresponding surface and the facing portions of said conduits defining a third annular Coanda slot, a supply of fluid under pressure, fluid conductor means connected between said supply and said conduits, said conductor means including an additional annular Coanda slot having a first parabolic discharge lip, said additional Coanda slot being supplied with said pressurized fluid and communicating with the atomsphere to induce a primary flow of ambient fluid over said first discharge lip, said first lip having a first parabolic axis which meets the direction of primary flow at a first acute angle, said conductor means directing said pressurized fluid and said primary flow from said first lip into said conduit and through said first and second Coanda slots, the fluid passing through said first and second Coanda slots inducing a secondary flow of ambient fluid into said third Coanda slot, the annular surface of each of said conduits having a second parabolic axis which meets the direction of secondary flow at a second acute angle, and a lip member of circular cross-section coaxially supported with respect to said conduits and having a second parabolic discharge lip adjacent said third Coanda slot, said second lip being defined by a parabolic segment revolved about said flow axis, the fluid flowing through said third Coanda slot inducing a tertiary flow of ambient fluid over said second lip, said second lip having a third parabolic axis which meets the direction of tertiary flow at a third acute angle, to thereby produce an axially directed propulsion force.

14. Lift producing apparatus of generally discoid configuration comprising, in combination, first and second annular conduits in spaced-apart coaxial relationship with each other, each of said conduits having an annular parabolic surface thereon, said conduits respectively including first and second annular Coanda solts cooperating with the corresponding surface and the facing portions of said conduits defining a third annular Coanda slot, a supply of fluid under pressure, fluid conductor means connected between said supply and said conduits, said conductor means including an additional annular Coanda slot having a first parabolic discharge lip, said additional Coanda slot being supplied with said pressurized fluid and communicating with the atmosphere to induce a primary flow of ambient fluid over said first discharge lip, said conductor means directing said pressurized fluid and said primary flow from said first lip into said conduits and simultaneously through said first and second Coanda slots, the fluid passing through said first and second Coanda slots inducing a secondary flow of ambient fluid into said third Coanda slot, and a lip member of circular cross-section coaxially supported with respect to said conduits and having a second parabolic discharge lip adjacent said third Coanda slot, said second lip being defined by a parabolic segment revolved about the axis of said member, the fluid flowing through said third Coanda slot inducing a tertiary flow of ambient fluid over said second lip and in the direction of said axis, to thereby produce a propulsion force having a axially directed lift component.

15. Apparatus of the character set forth in claim 14, in which said fluid conductor means includes a plurality of radially extending pipes interconnecting said additional Coanda slot with said first and second conduits, each of said pipes having airfoil means of insulating material on its exposed outer surface.

16. A discoid propulsion device for producing an axially directed propulsion force comprising, in combination, first and second conduits of annular configuration symmetrically disposed about an axis of flow in spaced-apart coaxial relationship with each other, each of said conduits having an annular parabolic surface thereon, said conduits respectively including first and second annular Coanda slots cooperating with the corresponding surface and the facing portions of said conduits defining a third annular Coanda slot, a supply of fluid under pressure, fluid conductor means connected between said supply and said conduits, said conductor means including an additional annular Coanda slot in coaxial relationship with said flow axis and having a first parabolic discharge lip, said additional Coanda slot being supplied with said pressurized fluid and communicating with the atmosphere to induce a primary flow of ambient fluid along said flow axis and over said first discharge lip, said first lip having a first parabolic axis which meets the direction of primary flow at a first acute angle, said conductor means directing said pressurized fluid and said primary flow from adjacent said first lip into said conduits and simultaneously through said first and second Coanda slots in a direction parallel to said flow axis, the fluid passing through said first and second Coanda slots inducing a secondary flow of ambient fluid into said third Coanda slot from a direction transverse to said flow axis, the annular surface of each of said conduits having a second parabolic axis which meets the direction of secondary flow at a second acute angle, and a lip member of circular cross-section coaxially supported with respect to said conduits and having a second parabolic discharge lip adjacent said third Coanda slot, said second lip being defined by a parabolic segment revolved about said flow axis, the fluid flowing through said third Coanda slot inducing a tertiary flow of ambient fluid over said second lip and in the direction of said axis, said second lip having a third parabolic axis which meets the direction of tertiary flow at a third acute angle, to thereby produce an axially directed propulsion force.

17. Apparatus of the character set forth in claim 16, in which said lip member is shaped to define a partially enclosed space adjacent said annular conduits, means supported in said space and supplied with fluid under pressure for increasing the pressure therein, and means for preventing the entrainment of ambient fluid from said space into said third Coanda slot.

18. A discoid propulsion device for producing an axially directed propulsion force comprising, in combination, first and second conduits of annular configuration symmetrically disposed about an axis of flow in spaced-apart coaxial relationship with each other, each of said conduits having an annular internal parabolic surface thereon, said conduits respectively including first and second annular Coanda slots cooperating with the corresponding surface and the facing portions of said conduits defining a third annular Coanda slot, a supply of fluid under pressure, fluid conductor means connected between said supply and said conduits, said conductor means including an additional annular Coanda slot in coaxial relationship with said flow axis and having a first parabolic discharge lip, said additional Coanda slot being supplied with said pressurized fluid and communicating with the atmosphere to induce a primary flow of ambient fluid along said flow axis and over said first discharge lip, said first lip having a first parabolic axis which meets the direction of primary flow at a first acute angle, said conductor means including a first group of radially extending fluid conductors connected to said first conduit and a second group of radially extending fluid conductors connected to said second conduit for directing said pressurized fluid and said primary flow from adjacent said first lip into the corresponding conduits and simultaneously through said first and second Coanda slots in a direction parallel to said flow axis, the fluid passing through said first and second Coanda slots inducing a secondary flow of ambient fluid outwardly away from said flow axis in a direction transverse thereto and into said third Coanda slot, the annular surface of each of said conduits having a second parabolic axis which meets the direction of secondary flow at a second acute angle, and a lip member of circular cross-section coaxially supported with respect to said conduits and having a second parabolic discharge lip adjacent the outer portion of said third Coanda slot, said second lip being defined by a parabolic segment revolved about said flow axis, the fluid flowing through said third Coanda slot inducing a tertiary flow of ambient fluid over said second lip and in the direction of said axis, said second lip having a third parabolic axis which meets the direction of tertiary flow at a third acute angle, to thereby produce an axially directed propulsion force.

19. Apparatus of the character set forth in claim 18, which comprises shroud means symmetrically supported around said lip member in spaced relationship therewith, said shroud means and said lip member forming a duct for the passage of said tertiary fluid flow.

20. A discoid propulsion device for producing an axially directed propulsion force comprising, in combination, first and second conduits of annular configuration symmetrically disposed about an axis of flow in spaced-apart coaxial relationship with each other, each of said conduits having an annular external parabolic surface thereon, said conduits respectively including first and second annular Coanda slots cooperating with the corresponding surface and the facing portions of said conduits defining a third annular Coanda slot, a supply of fluid under pressure, fluid conductor means connected between said supply and said conduits, said conductor means including an additional annular Coanda slot in coaxial relationship with said flow axis and having a first parabolic discharge lip, said additional Coanda slot being supplied with said pressurized fluid and communicating with the atmosphere to induce a primary flow of ambient fluid along said flow axis and over said first discharge lip, said first lip having a first parabolic axis which meets the direction of primary flow at a first acute angle, said conductor means including a plurality of radially extending fluid conductors for directing said pressurized fluid and said primary flow from adjacent said first lip into said conduits and simultaneously through said first and second Coanda slots in a direction parallel to said flow axis, each of said fluid conductors being connected to said first conduit and to said second conduit, the fluid passing through said first and second Coanda slots inducing a secondary flow of ambient fluid inwardly toward said flow axis in a direction transverse thereto and into said third Coanda slot, the annular surface of each of said conduits having a second parabolic axis which meets the direction of secondary flow at a second acute angle, and a lip member of circular cross-section coaxially supported with respect to said conduits and having a second parabolic discharge lip adjacent the inner portion of said third Coanda slot, said second lip being defined by a parabolic segment revolved about said flow axis, the fluid flowing through said third Coanda slot inducing a tertiary flow of ambient fluid over said second lip and in the direction of said axis, said second lip having a third parabolic axis which meets the direction of tertiary flow at a third acute angle, to thereby produce an axially directed propulsion force.

No references cited.

MARK NEWMAN, *Primary Examiner.*

C. R. CROYLE, *Assistant Examiner.*